(12) United States Patent
Przybyla (10) Patent No.: US 10,759,527 B2
(45) Date of Patent: Sep. 1, 2020

(54) TORQUE PATH COUPLING ASSEMBLIES FOR TILTROTOR AIRCRAFT

(71) Applicant: Textron Innovations Inc., Providence, RI (US)

(72) Inventor: Mark Alan Przybyla, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 57 days.

(21) Appl. No.: 16/212,045

(22) Filed: Dec. 6, 2018

(65) Prior Publication Data

US 2019/0276142 A1 Sep. 12, 2019

Related U.S. Application Data

(63) Continuation-in-part of application No. 15/914,527, filed on Mar. 7, 2018, now Pat. No. 10,648,519.

(51) Int. Cl.

| | |
|---|---|
| *B64C 27/28* | (2006.01) |
| *B64C 27/26* | (2006.01) |
| *B64C 11/28* | (2006.01) |
| *B64C 29/00* | (2006.01) |
| *B64C 27/625* | (2006.01) |
| *F16D 47/04* | (2006.01) |
| *F16D 41/069* | (2006.01) |

(Continued)

(52) U.S. Cl.
CPC .............. *B64C 27/28* (2013.01); *B64C 11/28* (2013.01); *B64C 27/26* (2013.01); *B64C 27/625* (2013.01); *B64C 27/68* (2013.01); *B64C 29/0033* (2013.01); *F16D 23/04* (2013.01); *F16D 41/069* (2013.01); *F16D 47/04* (2013.01)

(58) Field of Classification Search
CPC ......... B64C 11/28; B64C 27/22; B64C 27/26; B64C 27/28; B64C 27/30; B64C 27/52
See application file for complete search history.

(56) References Cited

U.S. PATENT DOCUMENTS 3,419,121 A * 12/1968 Stott ................... F16D 23/0606
192/53.331
3,515,500 A 6/1970 Nachod
(Continued)

OTHER PUBLICATIONS

European Search Report; Application No. EP 18195581.6; European Patent Office; dated Mar. 6, 2019.

*Primary Examiner* — Timothy D Collins
*Assistant Examiner* — Terri L Filosi
(74) *Attorney, Agent, or Firm* — Lawrence Youst PLLC (57) ABSTRACT

A rotary propulsion system for a tiltrotor aircraft operable to transition between rotary and non rotary flight modes. The rotary propulsion system includes an engine coupled to a freewheeling unit. A gear system positioned between the freewheeling unit and a proprotor assembly has a torque path coupling assembly disposed between an engine side gear assembly and a rotor side gear assembly. In a disengaged position, the torque path coupling assembly interrupts the torque path between the engine and the proprotor assembly. In an engaged position, the torque path coupling assembly completes the torque path between the engine and the proprotor assembly. A hybrid power unit is configured to accelerate the engine side gear assembly to match the output rotating speed to the input rotating speed enabling the torque path coupling assembly to shift from the disengaged position to the engaged position.

17 Claims, 7 Drawing Sheets

(51) Int. Cl.
*F16D 23/04* (2006.01)
*B64C 27/68* (2006.01)

(56) References Cited

U.S. PATENT DOCUMENTS

| | | | |
|---|---|---|---|
| 3,528,630 | A | 9/1970 | Ferris et al. |
| 6,622,962 | B1 | 9/2003 | White |
| 6,669,137 | B1 * | 12/2003 | Chen ........................ B64C 3/40 |
| | | | 244/7 R |
| 8,231,503 | B2 | 7/2012 | Buelna |
| 8,567,582 | B2 * | 10/2013 | Silva ..................... F16D 23/025 |
| | | | 192/53.3 |
| 8,998,125 | B2 | 4/2015 | Hollimon et al. |
| 2001/0017061 | A1 | 8/2001 | Friel |
| 2009/0224096 | A1 | 9/2009 | Waide et al. |
| 2016/0076629 | A1 | 3/2016 | Modrzejewski et al. |
| 2016/0152329 | A1 | 6/2016 | Tzeng et al. |
| 2016/0207600 | A1 * | 7/2016 | Grossman .............. B63H 11/02 |

* cited by examiner

TORQUE PATH COUPLING ASSEMBLIES FOR TILTROTOR AIRCRAFT

CROSS-REFERENCE TO RELATED APPLICATIONS

This is a continuation-in-part of co-pending application Ser. No. 15/914,527 filed Mar. 7, 2018, the entire contents of which are hereby incorporated by reference.

TECHNICAL FIELD OF THE DISCLOSURE

The present disclosure relates, in general, to tiltrotor aircraft having rotary and non rotary flight modes and, in particular, to rotary propulsion systems for tiltrotor aircraft having a torque path coupling assembly between the engine and the proprotor assembly to selectively interrupt and complete the torque path therebetween.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of conventional tiltrotor aircraft in forward flight.

SUMMARY

In a first aspect, the present disclosure is directed to a rotary propulsion system for a tiltrotor aircraft operable to transition between rotary and non rotary flight modes. The rotary propulsion system includes an engine having an engine rotating speed in the non rotary flight mode and an engine side gear assembly having an output with an output rotating speed. A freewheeling unit is coupled between the engine and the engine side gear assembly. A hybrid power unit is coupled to the engine side gear assembly. A rotor side gear assembly has an input with an input rotating speed. A proprotor assembly is coupled to the rotor side gear assembly. The proprotor assembly has a plurality of proprotor blades with a radially extended orientation and a proprotor rotating speed in the non rotary flight mode. A torque path coupling assembly is disposed between the input of the rotor side gear assembly and the output of the engine side gear assembly. In a disengaged position, the torque path coupling assembly interrupts a torque path between the engine and the proprotor assembly such that rotation of the output is independent of rotation of the input for the non rotary flight mode. In an engaged position, the torque path coupling assembly completes the torque path between the engine and the proprotor assembly such that rotation of the output is coupled to rotation of the input for the rotary flight mode. The hybrid power unit is configured to accelerate the engine side gear assembly to match the output rotating speed to the input rotating speed enabling the torque path coupling assembly to shift from the disengaged position to the engaged position.

In certain embodiments, the freewheeling unit may be a sprag clutch. In some embodiments, the hybrid power unit may be an electric motor and an electric energy source such as a battery or a capacitor. In other embodiments, the hybrid power unit may be an air motor and a compressed gas source such as a compressed carbon dioxide source. In certain embodiments, the torque path coupling assembly may include a coupling sleeve having internal splines. In the engaged position, the internal splines of the coupling sleeve are in mesh with the input and the output. In the disengaged position, the internal splines of the coupling sleeve are in mesh with the input and are out of mesh with the output. In some embodiments, the hybrid power unit may be configured to accelerate the engine side gear assembly to transition the freewheeling unit from a driving mode to an over running mode.

In a second aspect, the present disclosure is directed to a tiltrotor aircraft operable to transition between rotary and non rotary flight modes. The tiltrotor aircraft includes an engine having an engine rotating speed in the non rotary flight mode and an engine side gear assembly having an output with an output rotating speed. A freewheeling unit is coupled between the engine and the engine side gear assembly. An accessory gear assembly is coupled to the engine side gear assembly creating an accessory load thereon. A hybrid power unit is coupled to the engine side gear assembly. A rotor side gear assembly has an input with an input rotating speed. A proprotor assembly is coupled to the rotor side gear assembly. The proprotor assembly has a plurality of proprotor blades with a radially extended orientation and a proprotor rotating speed in the non rotary flight mode. A torque path coupling assembly is disposed between the input of the rotor side gear assembly and the output of the engine side gear assembly. In a disengaged position, the torque path coupling assembly interrupts a torque path between the engine and the proprotor assembly such that rotation of the output is independent of rotation of the input for the non rotary flight mode. In an engaged position, the torque path coupling assembly completes the torque path between the engine and the proprotor assembly such that rotation of the output is coupled to rotation of the input for the rotary flight mode. The hybrid power unit is configured to accelerate the engine side and the accessory gear assemblies to match the output rotating speed to the input rotating speed enabling the torque path coupling assembly to shift from the disengaged position to the engaged position.

In certain embodiments, the engine may have a turboshaft mode for the rotary flight mode and a turbofan mode for the non rotary flight mode. In some embodiments, the hybrid power unit may be configured to accelerate the engine side and the accessory gear assemblies to transition the freewheeling unit from a driving mode to an over running mode. In certain embodiments, the proprotor rotating speed in the non rotary flight mode may be generated responsive to aerodynamic forces acting on the proprotor blades. In some embodiments, the proprotor blades may have a non rotating and folded configuration in the non rotary flight mode.

In a third aspect, the present disclosure is directed to a method of transitioning a tiltrotor aircraft from a non rotary flight mode to a rotary flight mode. The method includes operating an engine in a turbofan mode at an engine rotating speed; rotating an output of an engine side gear assembly at an output rotating speed that is proportional to the engine rotating speed; rotating a proprotor assembly at a proprotor rotating speed responsive to aerodynamic forces acting on a plurality of proprotor blades; rotating an input of a rotor side gear assembly at an input rotating speed that is proportional to the proprotor rotating speed, with the input rotating speed being greater than the output rotating speed; accelerating the engine side gear assembly with a hybrid power unit to match the output rotating speed to the input rotating speed and to transition a freewheeling unit coupled between the engine and the engine side gear assembly from a driving mode to an over running mode; and actuating a torque path coupling assembly from a disengaged position, wherein the torque path coupling assembly interrupts a torque path between the engine and the proprotor assembly such that rotation of the output is independent of rotation of the input, to an engaged position, wherein the torque path coupling assembly completes the torque path between the engine and the proprotor assembly such that rotation of the output is coupled to rotation of the input, thereby transitioning the engine from the turbofan mode to a turboshaft mode and transitioning the tiltrotor aircraft from the non rotary flight mode to the rotary flight mode.

The method may also include establishing the input rotating speed between about 0.5 percent and about 1 percent higher than the output rotating speed prior to accelerating the engine side gear assembly with the hybrid power unit; establishing the input rotating speed between about 1 percent and about 2 percent higher than the output rotating speed prior to accelerating the engine side gear assembly with the hybrid power unit; increasing the engine rotating speed to transition the freewheeling unit from the over running mode to the driving mode after actuating the torque path coupling assembly; shifting an inner friction cone of a synchronizing ring into frictional contact with an outer conical face of the output and/or shifting a coupling sleeve having internal splines in mesh with the input and the output to complete the torque path between the engine and the proprotor assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
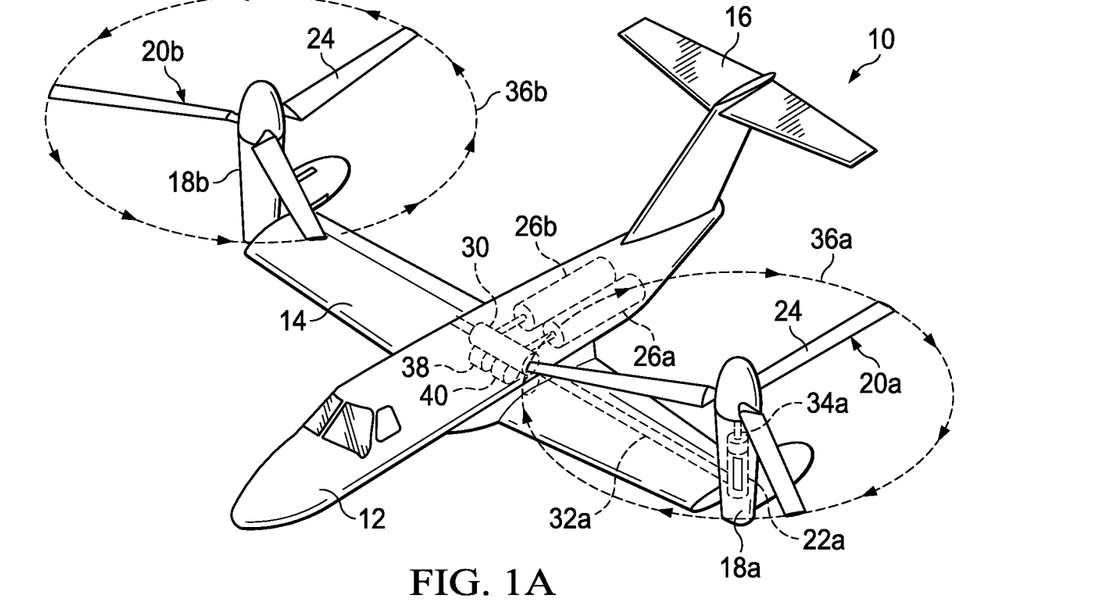
FIGS. 1A-1D are schematic illustrations of a tiltrotor aircraft in various flight modes in accordance with embodiments of the present disclosure.
Figure 1B:
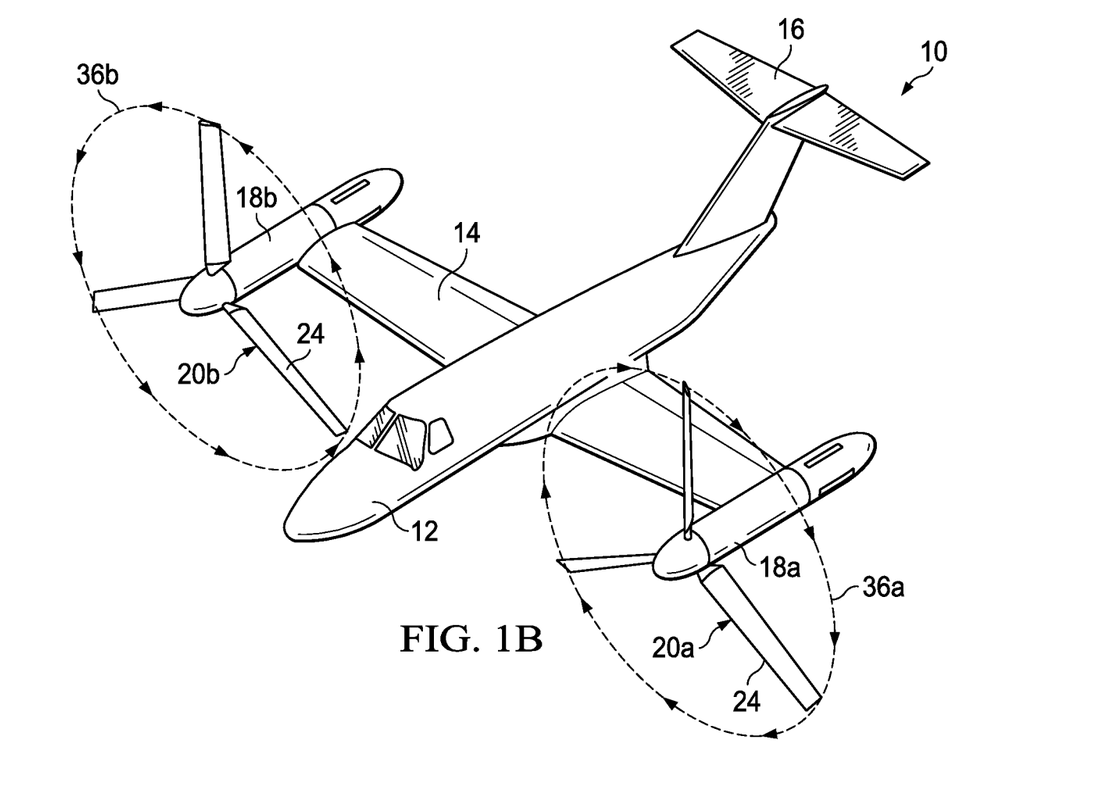
Figure 1C:
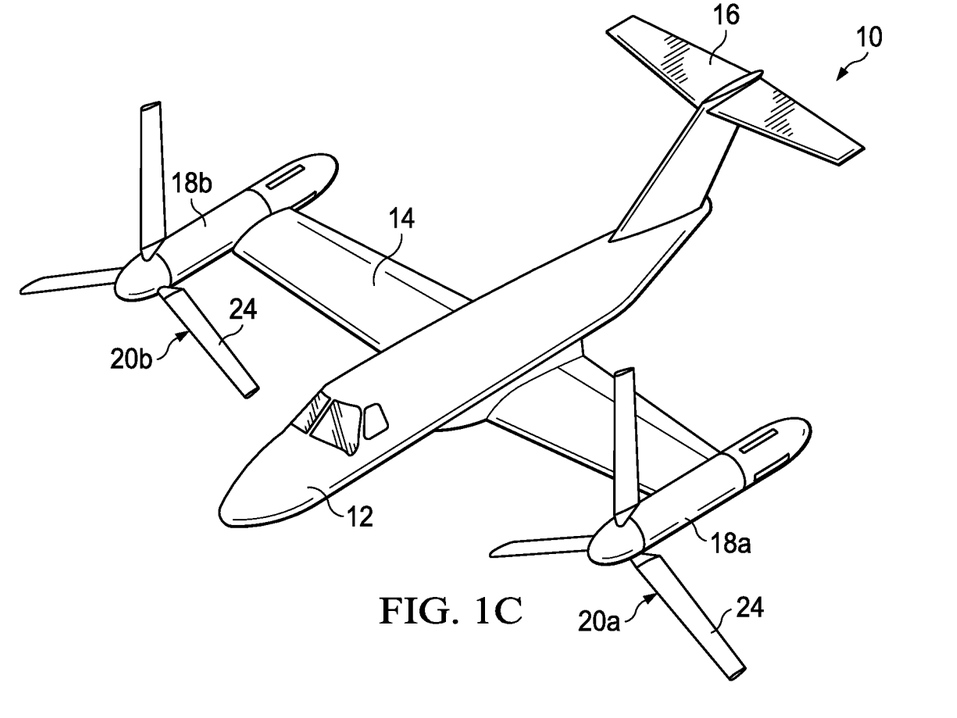
Figure 1D:
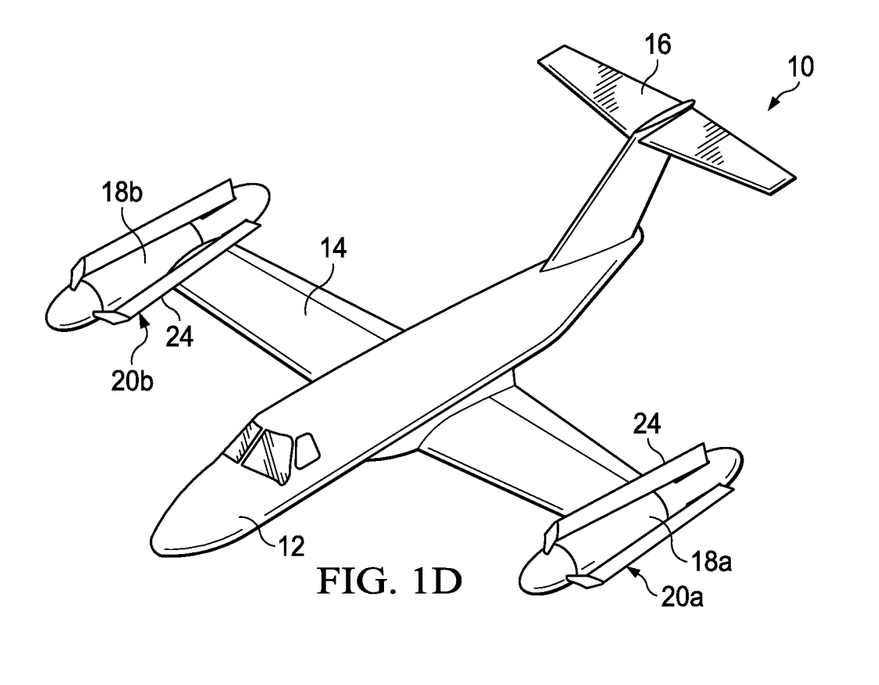

Referring to FIGS. 1A-1D in the drawings, a tiltrotor aircraft is schematically illustrated and generally designated 10. Aircraft 10 includes a fuselage 12, a wing 14 and tail assembly 16 including control surfaces operable for horizontal and/or vertical stabilization during forward flight. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. For example, a proprotor gearbox 22a is housed within pylon assembly 18a. Each proprotor gearbox includes a proprotor gearbox housing and a plurality of gears, such as planetary gears, used to adjust the engine output to a suitable rotational speed so that the engines and the proprotor assemblies may rotate at optimum speeds in rotary flight modes of aircraft 10.

Each proprotor assembly 20a, 20b includes a plurality of proprotor blades 24 that are operable to be rotated, as best seen in FIGS. 1A-1B, operable to be feathered, stopped, clocked and locked, as best seen in FIG. 1C and operable to be folded, as best seen in FIG. 1D. In the illustrated embodiment, proprotor assembly 20a is rotated responsive to torque and rotational energy provided by one or both of engines 26a, 26b via mid-wing gearbox 30, output shaft 32a, proprotor gearbox 22a and a mast 34a. Similarly, proprotor assembly 20b is rotated responsive to torque and rotational energy provided by one or both of engines 26a, 26b via mid-wing gearbox 30, an output shaft (not pictured), a proprotor gearbox (not pictured) and a mast (not pictured). In the illustrate embodiment, engines 26a, 26b are located in the aft portion of fuselage 12. Engines 26a, 26b may be operated in either a turboshaft mode, as best seen in FIGS. 1A-1B or a turbofan mode, as best seen in FIGS. 1C-1D. Even though the illustrated embodiment of aircraft 10 has been depicted and described as having two engines 26a, 26b, in other embodiments, aircraft 10 could have other numbers of engines both less than and greater than two.

FIG. 1A illustrates aircraft 10 in VTOL or helicopter flight mode, in which proprotor assemblies 20a, 20b are rotating in a substantially horizontal plane to provide vertical lift, such that aircraft 10 flies much like a conventional helicopter. In this configuration, engines 26a, 26b are operating in turboshaft mode wherein hot combustion gases in each engine 26a, 26b cause rotation of a power turbine that is mechanically coupled to proprotor assemblies 20a, 20b. Thus, in this configuration, aircraft 10 is considered to be in a rotary flight mode, wherein the rotary propulsion system of aircraft 10, including engines 26a, 26b, mid-wing gearbox 30, the proprotor gearboxes and proprotor assemblies 20a, 20b as well as the shafts and/or other elements coupled therebetween provides thrust, in the form of vertical lift, for aircraft 10. FIG. 1B illustrates aircraft 10 in proprotor forward flight mode, in which proprotor assemblies 20a, 20b are rotating in a substantially vertical plane to provide forward thrust enabling wing 14 to provide a lifting force responsive to forward airspeed, such that aircraft 10 flies much like a conventional propeller driven aircraft. In this configuration, engines 26a, 26b are operating in the turboshaft mode and aircraft 10 is considered to be in the rotary flight mode.

In the rotary flight mode of aircraft 10, proprotor assemblies 20a, 20b rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 36a, and proprotor assembly 20b rotates counterclockwise, as indicated by motion arrows 36b. In the illustrated embodiment, proprotor assemblies 20a, 20b each include three proprotor blades 24 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a, 20b are selectively positioned between proprotor forward flight mode and helicopter mode, which can be referred to as a conversion flight mode.

FIG. 1C illustrates aircraft 10 in transition from proprotor forward flight mode to airplane forward flight mode, in which the torque path between engines 26a, 26b and proprotor assemblies 20a, 20b has been interrupted and proprotor blades 24 have been feathered, or oriented to be streamlined in the direction of flight, such that proprotor blades 24 act as brakes to aerodynamically slow the rotation of proprotor assemblies 20a, 20b. In the illustrated embodiment, the rotation of proprotor assemblies 20a, 20b is stopped using, for example, brake systems. Preferably, the brake systems include position sensors such that the output shafts can be stopped at predetermined rotational positions. By stopping the output shafts in known rotational positions, the rotational positions of proprotor assemblies 20a, 20b is also known. This rotational clocking of proprotor blades 24 is important to prevent contact with wing 14 and to align each proprotor blade 24 with a respective slot in pylon assemblies 18a, 18b for folding. In the illustrated configuration of aircraft 10, engines 26a, 26b are operating in turbofan mode wherein hot combustion gases in each engine 26a, 26b cause rotation of a power turbine coupled to an output shaft that is used to power a turbofan that forces bypass air through a fan duct to create forward thrust enabling wing 14 to provide a lifting force responsive to forward airspeed, such that aircraft 10 flies much like a conventional jet aircraft. In this configuration, aircraft 10 is considered to be in a non rotary flight mode as proprotor assemblies 20a, 20b are no longer providing thrust for aircraft 10.

FIG. 1D illustrates aircraft 10 in high speed, airplane forward flight mode, in which proprotor blades 24 have been folded to be oriented substantially parallel to respective pylon assemblies 18a, 18b to minimize the drag force generated by proprotor blades 24. To prevent chatter or other movement of proprotor blades 24 when folded, proprotor blades 24 are preferably received within slots of pylon assemblies 18a, 18b. In this configuration, engines 26a, 26b are operating in the turbofan mode and aircraft 10 is considered to be in the non rotary flight mode. The forward cruising speed of aircraft 10 can be significantly higher in airplane forward flight mode versus proprotor forward flight mode as the forward airspeed induced proprotor aeroelastic instability is overcome.

As best seen in FIG. 1A, aircraft 10 includes one or more accessory gear assemblies 38 that are coupled to mid-wing gearbox 30. Accessory gear assemblies 38 receive torque and rotational energy from engines 26a, 26b and mid-wing gearbox 30 to power, for example, hydraulic pumps, generators, alternators, comfort systems such as air conditioning and the like. Accessory gear assemblies 38 thus place an accessory load on engines 26a, 26b and mid-wing gearbox 30 requiring a certain amount of power to be transferred thereto. Due at least in part to the accessory load, aircraft 10 includes a hybrid power unit 40 that is configured to accelerate the engine side gear assembly within mid-wing gearbox 30 such that the output rotating speed of the engine side gear assembly matches the input rotating speed of the rotor side gear assembly within mid-wing gearbox 30 enabling torque path coupling therebetween during transitions from the non rotary flight mode to the rotary flight mode of aircraft 10, as discussed herein.

Figure 2:
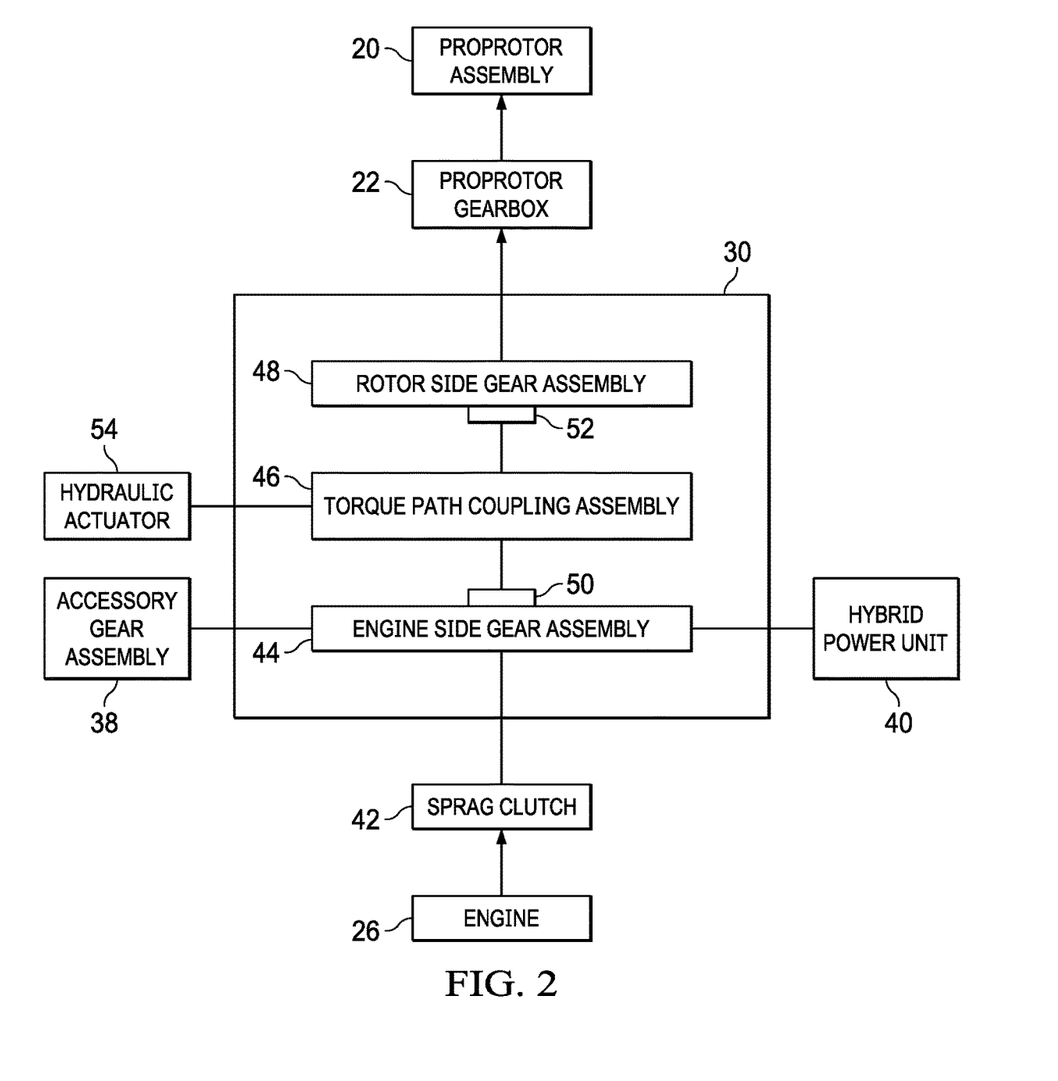
FIG. 2 is a block diagram of a rotary propulsion system having a torque path coupling assembly and a hybrid power unit for use in a tiltrotor aircraft in accordance with embodiments of the present disclosure.

Referring additionally to FIG. 2, an example embodiment of a rotary propulsion system for aircraft 10 will be described in greater detail. In the illustrated embodiment, the rotary propulsion system includes one or more engines 26, a mid-wing gearbox 30, one or more proprotor gearboxes 22 and one or more proprotor assemblies 20. One or more freewheeling units depicted as sprag clutches 42 are coupled between respective engines 26 and mid-wing gearbox 30. For convenience of discussion, the component elements of the illustrated rotary propulsion system may be referred to in the singular or collectively with the reference numerals in FIG. 2. For example, the power plant of aircraft 10 may be referred to as engine 26 or engines 26 that correspond to engines 26a, 26b discussed above. Sprag clutch 42 has a drive mode wherein torque from engine 26 is coupled to mid-wing gearbox 30 when the input rotating speed to sprag clutch 42 is matched with the output rotating speed from sprag clutch 42. In addition, sprag clutch 42 has an over running mode wherein torque from engine 26 is not coupled to mid-wing gearbox 30 when the input rotating speed to sprag clutch 42 is less than the output rotating speed from sprag clutch 42. As discussed herein, operating sprag clutch 42 in the over running mode aids in transitioning aircraft 10 from the non rotary flight mode to the rotary flight mode.

In the illustrated embodiment, mid-wing gearbox 30 includes a gear system having a engine side gear assembly 44, a torque path coupling assembly 46 and a rotor side gear assembly 48. In other embodiments, the gear system could be housed in multi discrete gearboxes that are coupled together with suitable shafts. Engine side gear assembly 44 is coupled to sprag clutch 42 and is operable to be driven by engine 26. Engine side gear assembly 44 may include one or more gears and/or gear subassemblies such as spiral beveled gear sets to change the direction of the torque from sprag clutch 42. Engine side gear assembly 44 includes an output 50, such as an output gear and/or an output shaft, that is rotatable during operation of engine side gear assembly 44. In the illustrated embodiment, the rotating speed of output 50 is proportional to the rotating speed of engine 26 when sprag clutch 42 is in drive mode based upon the gear ratio of engine side gear assembly 44. Rotor side gear assembly 48 is coupled to proprotor gearbox 22 and thus to proprotor assembly 20 by one or more shafts. Rotor side gear assembly 48 may include one or more gears and/or gear subassemblies. Rotor side gear assembly 48 includes an input 52, such as an input gear and/or an input shaft, that is rotatable during operation of rotor side gear assembly 48. In the illustrated embodiment, the rotating speed of input 52 is proportional to the rotating speed of proprotor assembly 20 based upon the gear ratio of rotor side gear assembly 48 and proprotor gearbox 22.

In the illustrated embodiment, torque path coupling assembly 46 is positioned between output 50 of engine side gear assembly 44 and input 52 of rotor side gear assembly 48. Torque path coupling assembly 46 is operable to selectively interrupt and complete the torque path between output 50 of engine side gear assembly 44 and input 52 of rotor side gear assembly 48 and thus between engine 26 and proprotor assembly 20. Torque path coupling assembly 46 is shiftable between engaged and disengaged positions by an actuation system depicted as hydraulic actuator 54 that is controlled by the pilot and/or the flight control system of aircraft 10. In the engaged position, torque path coupling assembly 46 completes the torque path between output 50 of engine side gear assembly 44 and input 52 of rotor side gear assembly 48 such that output 50 and input 52 are rotatably coupled together, rotate at the same speed and transfer torque therebetween. In the disengaged position, torque path coupling assembly 46 interrupts the torque path between output 50 and input 52 such that rotation of output 50 is independent of rotation of input 52 allowing output 50 and input 52 to rotate at different speeds as no torque is coupled therebetween.

As illustrated, aircraft 10 includes an accessory gear assembly 38 that are coupled to engine side gear assembly 44. Accessory gear assembly 38 receive torque and rotational energy from engine 26 via engine side gear assembly 44 to power, for example, hydraulic pumps, generators, alternators, comfort systems such as air conditioning and the like. Accessory gear assembly 38 thus place an accessory load on engine 26 and engine side gear assembly 44 requiring a certain amount of power to be transferred thereto. Due at least in part to the accessory load, aircraft 10 also includes a hybrid power unit 40 that is configured to accelerate the engine side gear assembly 44 during transitions from the non rotary flight mode to the rotary flight mode of aircraft 10 such that the rotating speed of output 50 matches the rotating speed of input 52 to enable torque path coupling assembly 46 to shift from the disengage position to the engaged position. In one non limiting example, hybrid power unit 40 may be an electric motor and an electric energy source such as a battery or a capacitor. Alternatively, hybrid power unit 40 may be any other suitable power unit including, for example, an air motor and a compressed gas source such as a compressed carbon dioxide source or a hydraulic motor and a pressurized hydraulic fluid source.

Referring again to FIG. 1B, the illustrated configuration may represented aircraft 10 in transition from airplane flight mode to proprotor forward flight mode. As stated, in airplane flight mode, aircraft 10 is considered to be in a non rotary flight mode as proprotor assemblies 20 are not providing thrust for aircraft 10 and torque from engines 26 is interrupted due to the disengaged position of torque path coupling assembly 46. In the illustrated configuration, proprotor blades 24 have been transitioned from the folded configuration in FIG. 1D to the radially extended configuration in FIG. 1C. Any brakes or locking mechanisms associated with proprotor assemblies 20 are now released, which allows proprotor assemblies 20 to windmill, as indicated by motion arrows 36a, 36b in FIG. 1B. The pitch of proprotor blades 24 may be collectively manipulated such that aerodynamic forces acting on proprotor blades 24 responsive to the forward airspeed of aircraft 10 cause proprotor assemblies 20 to rotate. The rotating speed of proprotor assemblies 20 is controlled based upon the pitch of proprotor blades 24, which is selected by the pilot and/or the flight control system of aircraft 10.

Since the rotating speed of input 52 is proportional to the rotating speed of proprotor assemblies 20, the rotating speed of input 52 is controlled based upon the pitch of proprotor blades 24. In addition, since the rotating speed of output 50 is proportional to the rotating speed of engines 26, the rotating speed of output 50 is controlled based upon the engine rotating speed. It is noted that even when engines 26 are in turbofan mode, the power shafts of engines 26 continue to rotate which in turn drives sprag clutches 42 as well as engine side gear assembly 44 including output 50 and accessory gear assembly 38. As torque path coupling assembly 46 is in the disengaged position, however, torque is not coupled to input 52 of rotor side gear assembly 48. In this disengaged position of torque path coupling assembly 46, the pitch of proprotor blades 24 is used to adjust the rotating speed of input 52 to be greater than the rotating speed of output 50. For example, the rotating speed of input 52 may be adjusted to be between about 0.5 percent and about 1 percent greater than the rotating speed of output 50. In another example, the rotating speed of input 52 may be adjusted to be between about 1 percent and about 2 percent greater than the rotating speed of output 50. In a further example, the rotating speed of input 52 may be adjusted to be between about 2 percent and about 5 percent greater than the rotating speed of output 50. When mid-wing gearbox 30 is operating with the rotating speed of input 52 greater than the rotating speed of output 50, hybrid power unit 40 is used to boost the rotating speed of engine side gear assembly 44 including output 50 to take advantage of the over running mode of sprag clutches 42 during the transition from non rotary flight mode to rotary flight mode, as discussed herein. Hybrid power unit 40 provides suitable torque and rotational energy to operate engine side gear assembly 44 and accessory gear assembly 38 at a rotating speed sufficient to maintain sprag clutches 42 in the over running mode for the time period required to shift torque path coupling assembly 46 from the disengaged to the engaged position.

Figure 3A:
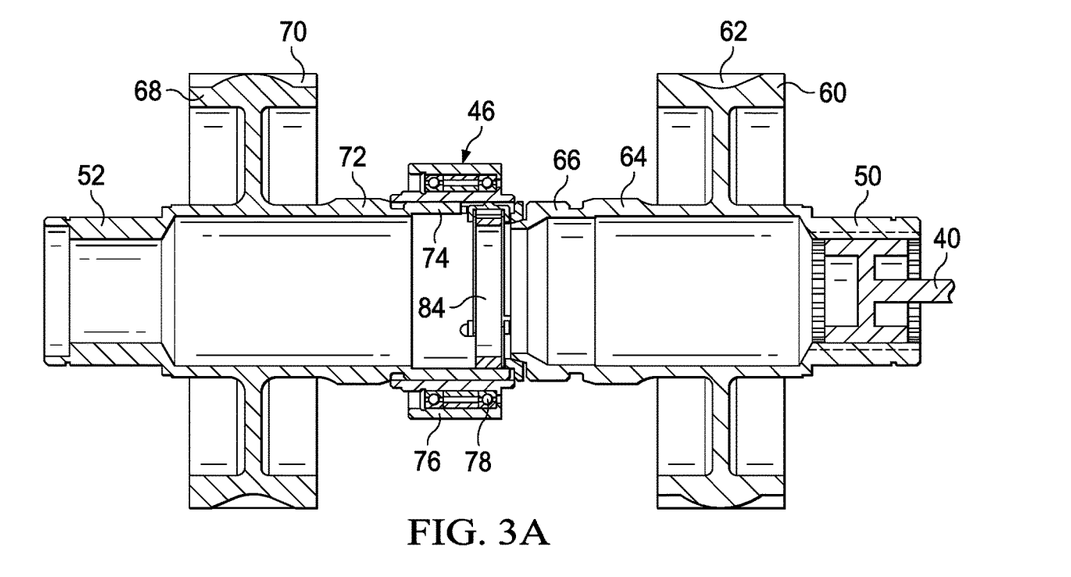
FIGS. 3A-3D are cross sectional views of a torque path coupling assembly and a hybrid power unit for use in a rotary propulsion system of a tiltrotor aircraft in accordance with embodiments of the present disclosure.
Figure 3B:
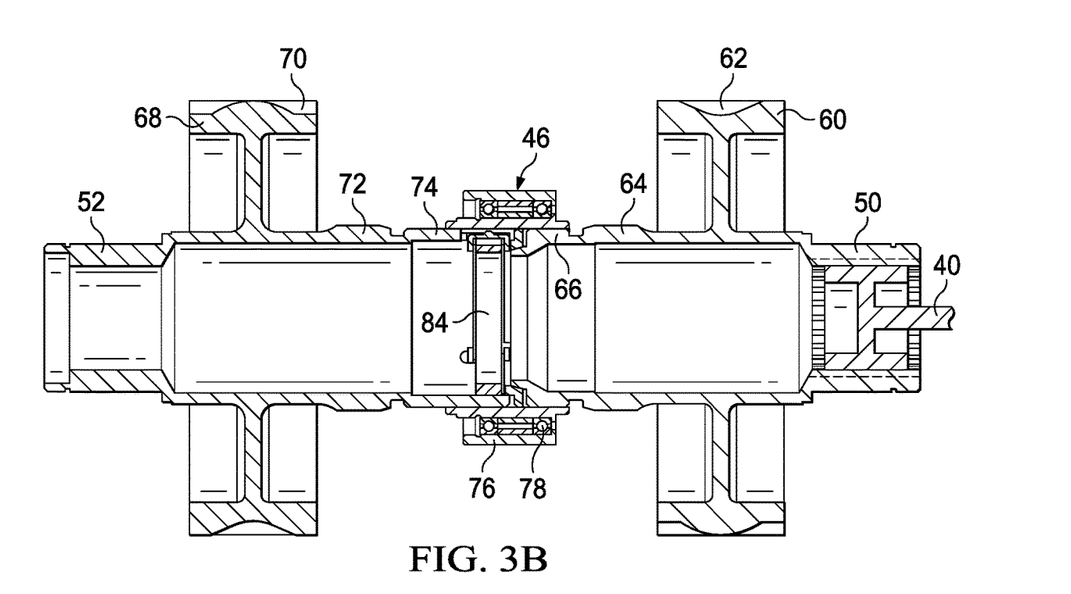
Figure 3C:
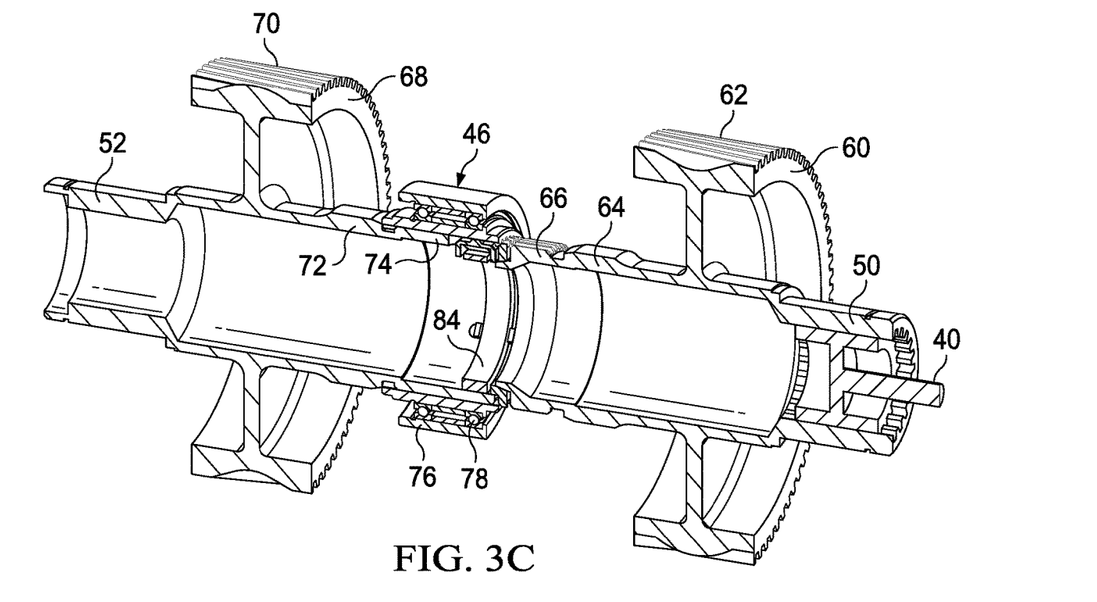
Figure 3D:
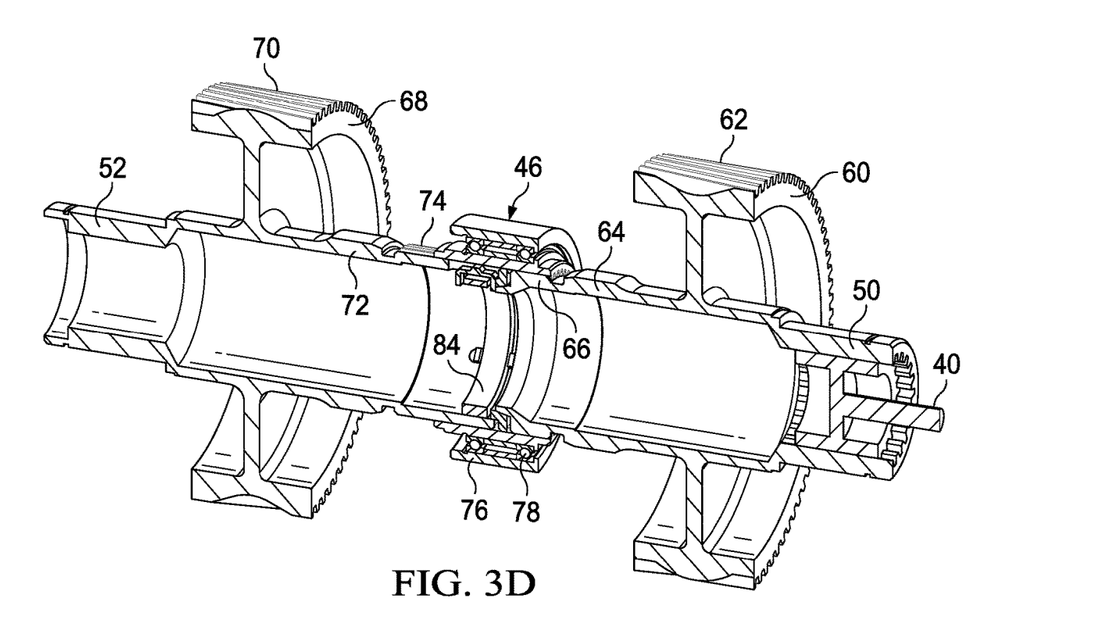

Referring additionally to FIGS. 3A-3D, a portion of the gear system of mid-wing gearbox 30 is depicted. In the illustrated embodiment, output 50 of engine side gear assembly 44 includes a gear element 60 having a plurality of external teeth 62 that are operable to mesh with one or more other gear elements (not pictured) of engine side gear assembly 44 or accessory gear assembly 38. In addition, output 50 of engine side gear assembly 44 includes a shaft element 64 having external splines 66 that are operable to selectively mesh with torque path coupling assembly 46. As illustrated, a drive gear of hybrid power unit 40 is coupled to an inner splined section of output 50. In the illustrated embodiment, input 52 of rotor side gear assembly 48 includes a gear element 68 having a plurality of external teeth 70 that are operable to mesh with one or more other gear elements (not pictured) of rotor side gear assembly 48. In addition, input 52 of rotor side gear assembly 48 includes a shaft element 72 having external splines 74 that are operable to mesh with torque path coupling assembly 46. FIGS. 3A and 3C show torque path coupling assembly 46 in the disengaged position wherein the rotation of output 50 of engine side gear assembly 44 is independent of the rotation of input 52 of rotor side gear assembly 48 thereby interrupting the torque path between engines 26 and proprotor assemblies 20. FIGS. 3B and 3D show torque path coupling assembly 46 in the engaged position wherein output 50 of engine side gear assembly 44 is coupled to input 52 of rotor side gear assembly 48 thereby completing the torque path between engines 26 and proprotor assemblies 20.

Referring additionally to FIGS. 4A-4D, an example embodiment of a torque path coupling assembly is depicted. Torque path coupling assembly 46 includes a non rotating carriage 76 that is coupled to hydraulic actuator 54. Disposed within non rotating carriage 76 is a bearing assembly depicted as ball bearing assembly 78 to allow relative rotation between non rotating carriage 76 and the rotating elements of torque path coupling assembly 46. Positioned within ball bearing assembly 78 is a coupling sleeve 80 having internal splines 82. Torque path coupling assembly 46 also includes a hub 84 that is coupled to input 52 of rotor side gear assembly 48 with a plurality of struts 86 spring mounted therearound. In the illustrated embodiment, torque path coupling assembly 46 includes three spring mounted struts 86 but in other embodiments, a torque path coupling assembly could have other numbers of spring mounted struts. Torque path coupling assembly 46 includes a synchronizing ring 88 having outer splines 90 and an inner friction cone 92.

The operation of torque path coupling assembly 46 will now be described with reference to FIGS. 1B, 3A-3D and 4A-4D. Prior to actuating torque path coupling assembly 46 from the disengaged position (FIG. 4A), wherein the torque path between engines 26 and proprotor assemblies 20 is interrupted, to the engaged position (FIG. 4D), wherein the torque path between engines 26 and proprotor assemblies 20 is completed, aircraft 10 is operated such that the rotating speed of input 52 is greater than the rotating speed of output 50. As discussed herein, this is achieved by controlling the rotating speed of engines 26 and the rotating speed of proprotor assemblies 20. In this configuration, input 52 rotates with coupling sleeve 80, hub 84, struts 86 and synchronizing ring 88. At the same time, output 50 rotates independent of input 52 at a slightly slow rotating speed. The pilot and/or flight control system of aircraft 10 now signals hybrid power unit 40 to boost or accelerate the rotating speed of engine side gear assembly 44 including output 50 to transition sprag clutches 42 from the driving mode to the over running mode wherein the input rotating speed to sprag clutches 42 is less than the output rotating speed from sprag clutches 42, thereby disconnecting the torque of engines 26 from engine side gear assembly 44. As noted, hybrid power unit 40 provides suitable torque and rotational energy to operate engine side gear assembly 44 and accessory gear assembly 38 coupled thereto while sprag clutches 42 are in the over running mode.

In this operation, hybrid power unit 40 boosts or accelerates the rotating speed of output 50 to match the rotating speed of input 52. As used herein, the term "match" as it relates to the rotating speeds of input 52 and output 50 means that the rotating speeds of input 52 and output 50 are sufficiently close to allow the friction contact described below to synchronize the rotating speeds of input 52 and output 50. Next, the pilot and/or flight control system of aircraft 10 signals hydraulic actuator 54 to shift coupling sleeve 80 toward output 50 which causes struts 86 to contact synchronizing ring 88 bringing inner friction cone 92 of synchronizing ring 88 into friction contact with an outer conical face 94 of output 50. The friction contact synchronizes the rotating speeds of input 52 and output 50 while sprag clutches 42 continue to operate in the over running mode. It is noted that operating sprag clutches 42 in the over running mode reduces and/or eliminates the applied torque from engines 26 allowing for smoother meshing of torque path coupling assembly 46 with outer splines 66 of output 50.

Figure 4A:
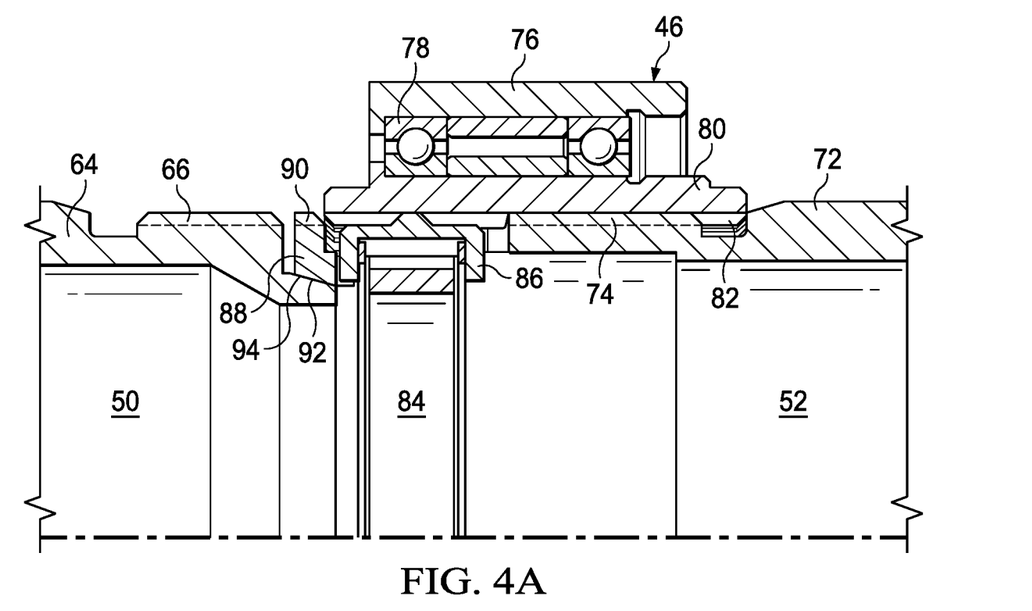
FIGS. 4A-4D are cross sectional views depicting the operation of a torque path coupling assembly for use in a rotary propulsion system of a tiltrotor aircraft in accordance with embodiments of the present disclosure.
Figure 4B:
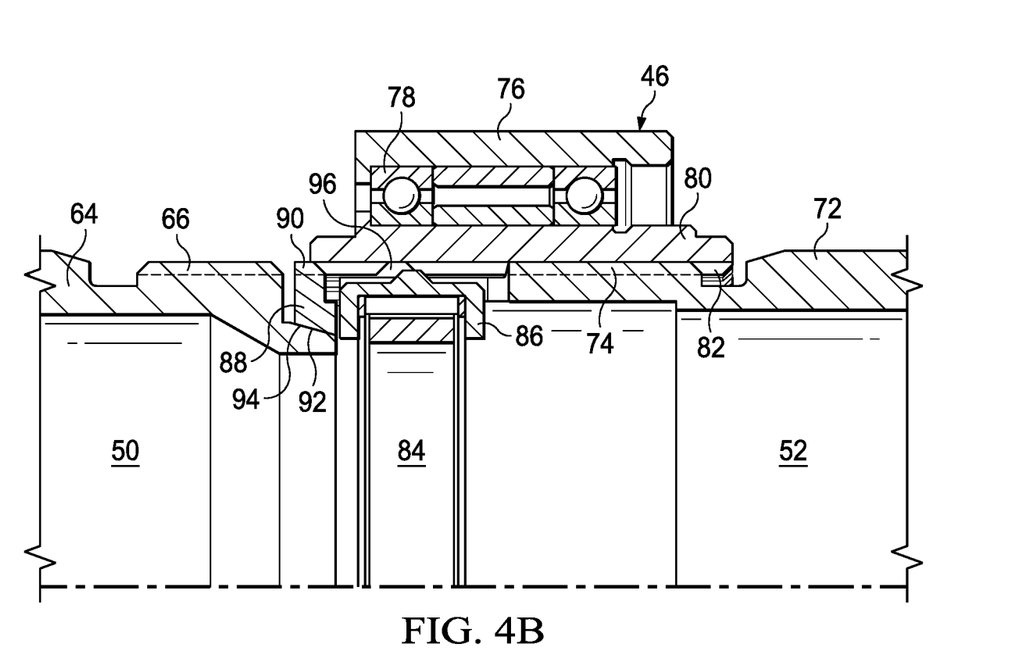
Figure 4C:
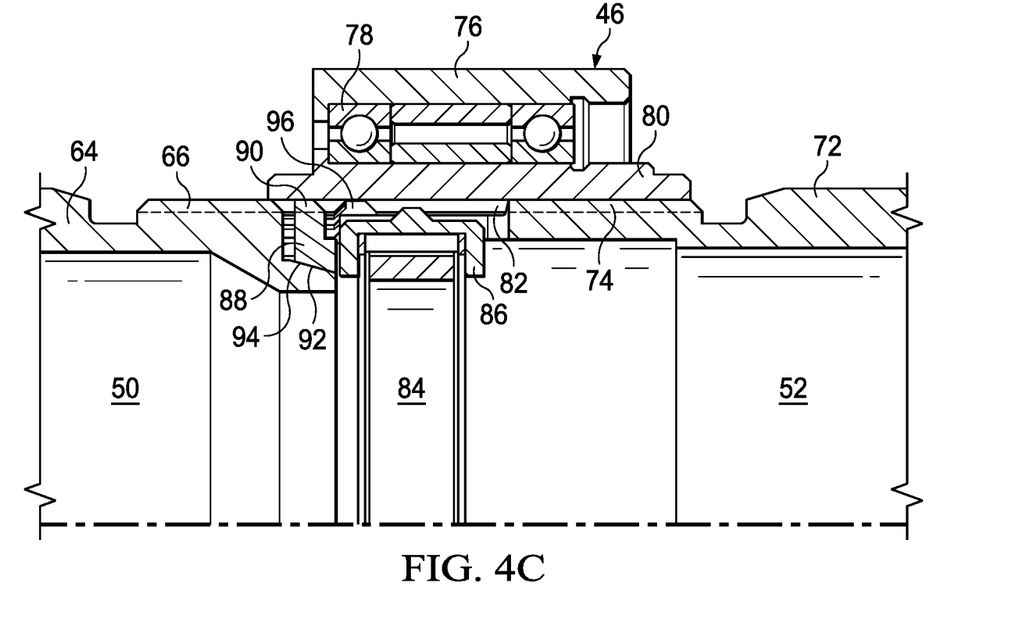

Once friction contact between inner friction cone 92 of synchronizing ring 88 and outer conical face 94 of output 50 is established, hydraulic actuator 54 shifts coupling sleeve 80 further toward output 50 which causes keys 96 to radially contact struts 86, as best seen in FIG. 4B. In this configuration, struts 86 no longer contact synchronizing ring 88, however, the front edges of inner splines 82 of coupling sleeve 80 maintain pressure on outer splines 90 of synchronizing ring 88 which maintains the friction contact between inner friction cone 92 of synchronizing ring 88 and outer conical face 94 of output 50. The friction contact between inner friction cone 92 of synchronizing ring 88 and outer conical face 94 of output 50 maintains the synchronized rotating speed of output 50 with the rotating speed of input 52. Further shifting of coupling sleeve 80 toward output 50 aligns inner splines 82 of coupling sleeve 80 with outer splines 90 of synchronizing ring 88 allowing inner splines 82 of coupling sleeve 80 to mesh with outer splines 90 of synchronizing ring 88, as best seen in FIG. 4C.

Figure 4D:
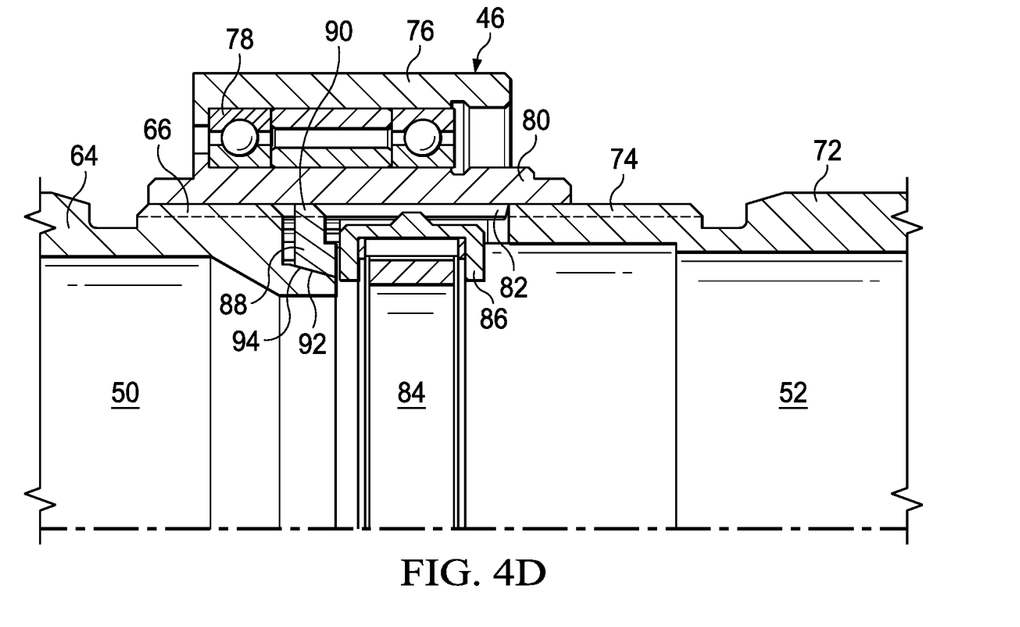

In this configuration, with sprag clutches 42 in the over running mode and the rotating speeds of output 50 and input 52 synchronizes, further shifting of coupling sleeve 80 toward output 50 brings inner splines 82 of coupling sleeve 80 in mesh with outer splines 66 of output 50, which is the engaged position of torque path coupling assembly 46, as best seen in FIG. 4D. In this engaged position of torque path coupling assembly 46, the torque path between output 50 and input 52 is complete such that input 52 rotates with output 50. Torque and rotational energy may now be transferred from output 50 to input 52 and thus from engines 26 to proprotor assemblies 20. By increasing the operating speed of engines 26, sprag clutches 42 transition from the over running mode to the drive mode such that engines 26 provide torque and rotational energy to proprotor assemblies 20. Engines 26 are now operating in turboshaft mode and aircraft 10 is now operating in rotary flight mode.

Even though aircraft 10 has been described as having a rotary propulsion system having two engines located within the fuselage and two proprotor assemblies at outboard stations of the wing, it should be understood by those having ordinary skill in the art that other engine and other proprotor assembly arrangements are possible and are considered to be within the scope of the present disclosure. In addition, even though the rotary propulsion system has been described and illustrated in the context of tiltrotor aircraft 10, it should be understood by those having ordinary skill in the art that the rotary propulsion system disclosed herein can be implemented on other aircraft including, for example, multi rotor aircraft wherein selective operation of certain rotors during flight may be desirable.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotary propulsion system for a tiltrotor aircraft operable to transition between rotary and non rotary flight modes, the rotary propulsion system comprising:
    an engine having an engine rotating speed in the non rotary flight mode;
    an engine side gear assembly having an output with an outer conical face and an output rotating speed;
    a freewheeling unit coupled between the engine and the engine side gear assembly;
    a hybrid power unit coupled to the engine side gear assembly;
    a rotor side gear assembly having an input with an input rotating speed;
    a proprotor assembly coupled to the rotor side gear assembly, the proprotor assembly having a plurality of proprotor blades with a radially extended orientation and a proprotor rotating speed in the non rotary flight mode; and
    a torque path coupling assembly disposed between the input of the rotor side gear assembly and the output of the engine side gear assembly,
    wherein, in a disengaged position, the torque path coupling assembly interrupts a torque path between the engine and the proprotor assembly such that rotation of the output is independent of rotation of the input for the non rotary flight mode;
    wherein, in an engaged position, the torque path coupling assembly completes the torque path between the engine and the proprotor assembly such that rotation of the output is coupled to rotation of the input for the rotary flight mode;
    wherein, the torque path coupling assembly includes a coupling sleeve and a synchronizing ring, the coupling sleeve having internal splines that are in mesh with the input of the rotor side gear assembly and in mesh with the output of the engine side gear assembly when the torque path coupling assembly is in the engaged position, the synchronizing ring having outer splines and an inner friction cone, the outer splines operable to selectively align with the internal splines of the coupling sleeve;
    wherein, the hybrid power unit is configured to accelerate the engine side gear assembly to match the output rotating speed to the input rotating speed enabling the torque path coupling assembly to shift from the disengaged position to the engaged position; and
    wherein, the inner friction cone of the synchronizing ring is shifted into friction contact with the outer conical face of the output of the engine side gear assembly responsive to shifting the coupling sleeve to synchronize the output rotating speed and input rotating speed.

2. The rotary propulsion system as recited in claim 1 wherein the freewheeling unit further comprises a sprag clutch.

3. The rotary propulsion system as recited in claim 1 wherein the hybrid power unit further comprises an electric motor and an electric energy source.

4. The rotary propulsion system as recited in claim 3 wherein the electric energy source further comprises a battery.

5. The rotary propulsion system as recited in claim 1 wherein the hybrid power unit further comprises an air motor and a compressed gas source.

6. The rotary propulsion system as recited in claim 5 wherein the compressed gas source further comprises a compressed carbon dioxide source.

7. The rotary propulsion system as recited in claim 1 wherein, in the disengaged position, the internal splines of the coupling sleeve are in mesh with the input and are out of mesh with the output.

8. The rotary propulsion system as recited in claim 1 wherein the hybrid power unit is configured to accelerate the engine side gear assembly to transition the freewheeling unit from a driving mode to an over running mode.

9. A tiltrotor aircraft operable to transition between rotary and non rotary flight modes, the tiltrotor aircraft comprising:
    an engine having an engine rotating speed in the non rotary flight mode;
    an engine side gear assembly having an output with an outer conical face and an output rotating speed;
    a freewheeling unit coupled between the engine and the engine side gear assembly;
    an accessory gear assembly coupled to the engine side gear assembly creating an accessory load thereon;

a hybrid power unit coupled to the engine side gear assembly;

a rotor side gear assembly having an input with an input rotating speed;

a proprotor assembly coupled to the rotor side gear assembly, the proprotor assembly having a plurality of proprotor blades with a radially extended orientation and a proprotor rotating speed in the non rotary flight mode; and a torque path coupling assembly disposed between the input of the rotor side gear assembly and the output of the engine side gear assembly, wherein, in a disengaged position, the torque path coupling assembly interrupts a torque path between the engine and the proprotor assembly such that rotation of the output is independent of rotation of the input for the non rotary flight mode;

wherein, in an engaged position, the torque path coupling assembly completes the torque path between the engine and the proprotor assembly such that rotation of the output is coupled to rotation of the input for the rotary flight mode;

wherein, the torque path coupling assembly includes a coupling sleeve and a synchronizing ring, the coupling sleeve having internal splines that are in mesh with the input of the rotor side gear assembly and in mesh with the output of the engine side gear assembly when the torque path coupling assembly is in the engaged position, the synchronizing ring having outer splines and an inner friction cone, the outer splines operable to selectively align with the internal splines of the coupling sleeve;

wherein, the hybrid power unit is configured to accelerate the engine side gear assembly to match the output rotating speed to the input rotating speed enabling the torque path coupling assembly to shift from the disengaged position to the engaged position; and wherein, the inner friction cone of the synchronizing ring is shifted into friction contact with the outer conical face of the output of the engine side gear assembly responsive to shifting the coupling sleeve to synchronize the output rotating speed and input rotating speed.

10. The tiltrotor aircraft as recited in claim 9 wherein the engine has a turboshaft mode for the rotary flight mode and a turbofan mode for the non rotary flight mode.

11. The tiltrotor aircraft as recited in claim 9 wherein the hybrid power unit is configured to accelerate the engine side and the accessory gear assemblies to transition the freewheeling unit from a driving mode to an over running mode.

12. The tiltrotor aircraft as recited in claim 9 wherein the proprotor rotating speed in the non rotary flight mode is generated responsive to aerodynamic forces acting on the proprotor blades.

13. The tiltrotor aircraft as recited in claim 9 wherein the proprotor blades further comprise a non rotating and folded configuration in the non rotary flight mode.

14. A method of transitioning a tiltrotor aircraft from a non rotary flight mode to a rotary flight mode, the method comprising:

operating an engine in a turbofan mode at an engine rotating speed;

rotating an output of an engine side gear assembly at an output rotating speed that is proportional to the engine rotating speed;

rotating a proprotor assembly at a proprotor rotating speed responsive to aerodynamic forces acting on a plurality of proprotor blades;

rotating an input of a rotor side gear assembly at an input rotating speed that is proportional to the proprotor rotating speed, the input rotating speed greater than the output rotating speed;

accelerating the engine side gear assembly with a hybrid power unit to match the output rotating speed to the input rotating speed and to transition a freewheeling unit coupled between the engine and the engine side gear assembly from a driving mode to an over running mode; and actuating a torque path coupling assembly from a disengaged position, wherein the torque path coupling assembly interrupts a torque path between the engine and the proprotor assembly such that rotation of the output is independent of rotation of the input, to an engaged position, wherein the torque path coupling assembly completes the torque path between the engine and the proprotor assembly including synchronizing the output rotating speed with the input rotating speed by shifting an inner friction cone of a synchronizing ring into friction contact with an outer conical face of the output of the engine side gear assembly and coupling the output of the engine side gear assembly to the input of the rotor side gear assembly by shifting internal splines of a coupling sleeve in mesh with outer splines of the synchronizing ring and in mesh with the output of the engine side gear assembly, thereby transitioning the engine from the turbofan mode to a turboshaft mode and transitioning the tiltrotor aircraft from the non rotary flight mode to the rotary flight mode.

15. The method as recited in claim 14 further comprising establishing the input rotating speed between about 0.5 percent and about 1 percent higher than the output rotating speed prior to accelerating the engine side gear assembly with the hybrid power unit.

16. The method as recited in claim 14 further comprising establishing the input rotating speed between about 1 percent and about 2 percent higher than the output rotating speed prior to accelerating the engine side gear assembly with the hybrid power unit.

17. The method as recited in claim 14 further comprising increasing the engine rotating speed to transition the freewheeling unit from the over running mode to the driving mode after actuating the torque path coupling assembly.

* * * * *